Dec. 27, 1966 M. DESPERIER 3,294,379
GUARDED PERFORATED TRAY FOR CONTACTING LIQUIDS AND GASES
Filed March 25, 1963 3 Sheets-Sheet 3

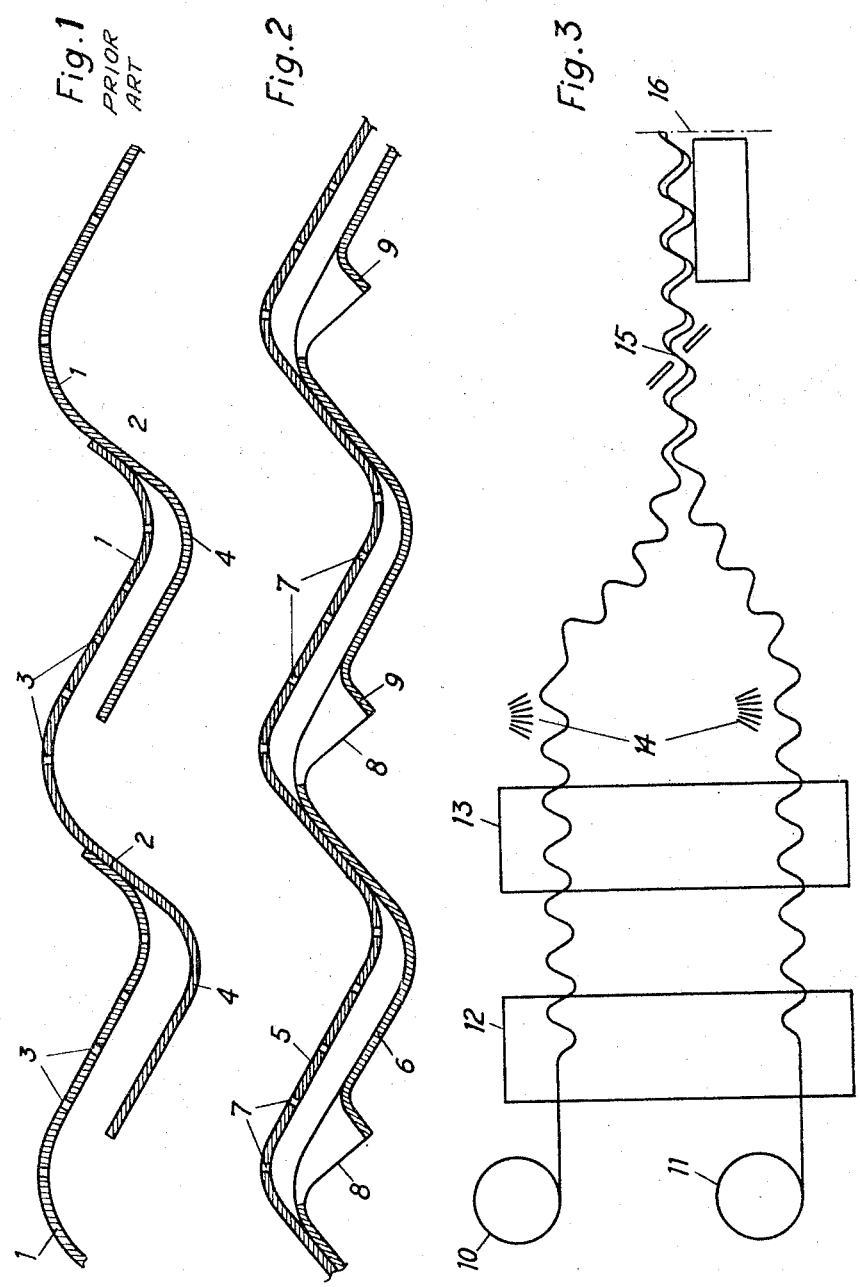

INVENTOR
MICHEL DESPERIER
By Irwin S. Thompson
ATTY.

United States Patent Office 3,294,379
Patented Dec. 27, 1966

3,294,379
GUARDED PERFORATED TRAY FOR CONTACTING LIQUIDS AND GASES
Michel Desperier, Saint-Maurice, France, assignor to l'Air Liquide, Societe Anonyme Pour l'Etude et l'Exploitation des Procedes Georges Claude
Filed Mar. 25, 1963, Ser. No. 267,508
Claims priority, application France, Apr. 5, 1962, 893,424, Patent No. 1,327,227
2 Claims. (Cl. 261—114)

This invention relates to guarded perforated trays for contacting liquids and gases, including on one hand an upper plate with a non-rectilinear profile providing a gas-liquid contact surface and provided with openings for dispersing the gas inside the liquid, and on the other hand a lower plate with a non-rectilinear profile, the lower portions of which make up liquid guards and the upper portions of which are provided with openings for the free passage of the gas towards the upper plate.

Such guarded trays are usually made of narrow units, which are longitudinally welded so as to give, on one hand, a continuous surface on which the liquid circulates, perforated with openings for the passage of the gas, and on the other hand, a discontinuous surface playing the part of a guard for the liquid. A guarded tray of this type, which has shown excellent efficiency, was the subject of French Patent No. 1,100,970 of March 11, 1954, and U.S. Patent 2,884,236.

However, the production of such guarded trays has disadvantages. First of all, it requires the preparation of a large number of units, which are then assembled by long, continuous welding lines. On the other hand, such trays have rather poor mechanical properties, whereas they are subjected to all sorts of strains during manufacture, erection and operation. This entails the use of many braces to support and consolidate the trays. Nevertheless, the trays run the risk of warping, with consequent decrease of the interval between the guarding units and the nearest perforated surface. Such warpings involve large alterations of the operating characteristics of a column fitted with such trays, so that a previous theoretical evaluation of those characteristics becomes difficult.

Finally, such a method of production of guarded trays seems to be suitable only for copper trays, as tin-lead solder is the only one allowing continuous assembling through lap weldings with maximum mechanization. Now the use of tin-lead solder is suitable only on copper, so that it is difficult to use other metals than copper for the production of guarded trays according to this method.

The tray which is the subject of this invention is characterized in that the upper and lower surfaces are fastened to one another in such areas that the tray assembly has the structure of an assembly of box girders.

Such a tray does not have the disadvantages of conventional trays. Instead of multiple assembled units, it only has two overlying surfaces, which can be mutually fastened at a limited number of points only. Besides, the rigidity of such an assembly is definitely higher than the rigidity of conventional guarded trays, due to the co-operation of two non-planar surfaces into the structure of an assembly of box girders.

Other advantages of making guarded trays according to this invention shall appear in the following description, chosen as an example, of embodiments of the invention, with reference to the appended drawings, where:

FIG. 1 is a vertical section of a portion of a conventional guarded tray with a given profile;

FIG. 2 is a vertical section of a portion of a guarded tray with the same type of profile as the one shown on FIG. 1, but made according to this invention;

FIG. 3 is a simplified diagram of a continuous production line for guarded trays with rectilinear ridges according to the invention, where the metal sheets advance at right angles to the direction of the corrugations;

Figure 4:
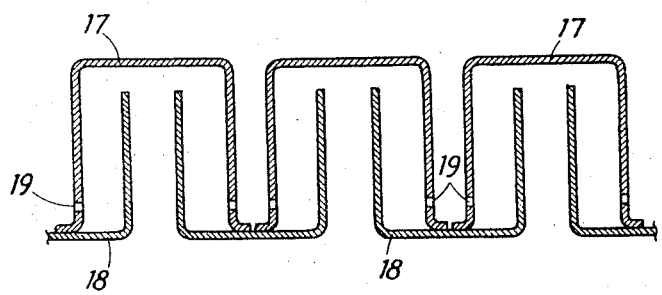
FIG. 4 is a vertical section of a portion of a guarded tray with a different profile from that of FIG. 1.

The plate shown in section on FIG. 1 belongs to the type of guarded tray made according to a conventional method and described in French Patent No. 1,100,970 and U.S. Patent 2,884,236. This tray is made by assembling corrugated units 1, welded at 2 by continuous welding, so as to give a surface of contact provided with openings 3 and discontinuous surfaces or gutters 4 serving as guards for the liquid. Those gutters are so arranged that they do not hinder the ascending movement of the gas, and that they do not cause appreciable loss of head.

FIG. 2 shows a guarded tray of the same type, but with improvements according to the invention. It is made of two overlying corrugated sheets 5 and 6, staggered so as to touch each other on one flank per corrugation only, the contacting portions being spot-welded. While continuous welding was necessary in the conventional method, the assembling of plates or sheets 5 and 6 by spot welding gives a sufficiently rigid assembly. It follows that the production of trays according to the invention is not limited to the use of copper, but that other materials or metals, such as light alloys or even plastics, may henceforth be used.

Due to the high rigidity conferred to the assembly, stiffening devices can be reduced to a minimum, and the risk of a contraction of the intervals between both surfaces is practically nil.

The operation of the tray according to the invention is similar to that of the conventional tray on FIG. 1. The upper plate or sheet is provided with openings 7 similar to the openings 3 on FIG. 1. Moreover, to allow a passage of the ascending gases similar to that allowed by the arrangement shown on FIG. 1, the invention provides for orifices 8 at the upper part of the free flank of each corrugation of plate or sheet 6.

It was therefore to be foreseen that the arrangement of such a continuous guard plate with orifices would create some problems as to the resistance against the passage of the ascending gas. The number and arrangement of orifices 8 had to be so settled that the loss of head due to those orifices was not higher than that due to gutters 4 of the conventional tray. This was done experimentally, by comparing a dry tray unit according to the invention with an equivalent conventional tray unit. The unit under investigation was connected to a chamber into which air was blown, and the pressure drop created in the chamber by the resistance of the dry tray unit to the passage of the air was noted.

Thus, a pressure drop of about 15 mm. water having been noted for a conventional tray unit, it has been possible to make a tray unit according to the invention with orifices so arranged that the pressure drop due to that element was about 13 mm., under the same conditions of operation of the measuring instrument.

The orifices which made it possible to get this result are arranged with a pitch of 42.5 mm., leaving a passage of 40 x 8 mm. for the gas and uncovering two rows of perforations. Each orifice is also featured by a drooping edge 9, flanged parallel to the contact flanks of the plates. This edge 9, which is 5 mm. wide, is continuously connected to the opposite edge.

The head-loss readings on a series of conventional tray units and on a series of tray units according to the invention showed besides that the trays according to the invention had more uniform characteristics, which is notably due to their greater rigidity, to their absence of warp and to the accuracy with which they can be produced. Indeed, rational production of trays according to the invention is made possible by the fact that they are made of two units only.

A continuous production line of such trays is shown diagrammatically on FIG. 3, where 10 and 11 are two rolls of light-alloy sheet, 0.5 mm. thick and 1 m. wide. The sheets are embossed at 12, perforated at 13, then scoured and pickled at 14, for instance by solvent spraying and abrasive blasting, before they are brought together for spot welding at 15, on the flanks of the corrugations, by means of a battery of resistance welders. The resulting band, which is obtained at the speed of a single perforated sheet, is finally sheared at 16.

The invention could of course be applied to other types of guarded trays than the one shown on FIG. 1. It could thus be applied to a known type of tray, a section of which is shown on FIG. 4. This tray includes units 17 and 18, with rectangular sections, welded to one another and playing the part of a surface of contact at 17, and of liquid guards in 18. The openings for the passage of the gas in units 17 of the surface of contact are shown at 19.

Figure 5:
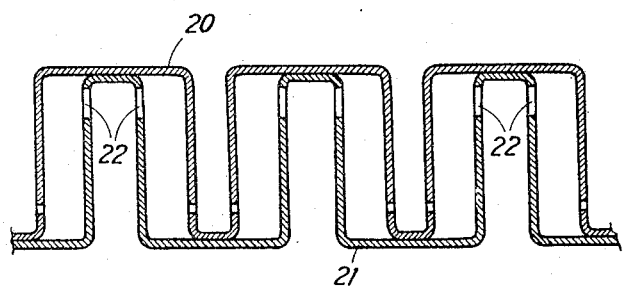
FIG. 5 is a vertical section of a portion of a guarded tray with the same type of profile as on FIG. 4, but made according to the invention.

FIG. 5 shows the same type of tray, built according to the invention. The tray then includes two continuous plates or sheets 20 and 21, welded at their points of contact, sheet 20 being provided with openings similar to openings 19 on FIG. 4 and sheet 21 being provided with openings 22 in its upper portion, so as to allow the passage of gas towards the contact surface of sheet 20. The upper portions of sheet 21, with the lower portions of sheet 20 therefore play the part of spacers between both sheets.

Figure 6:
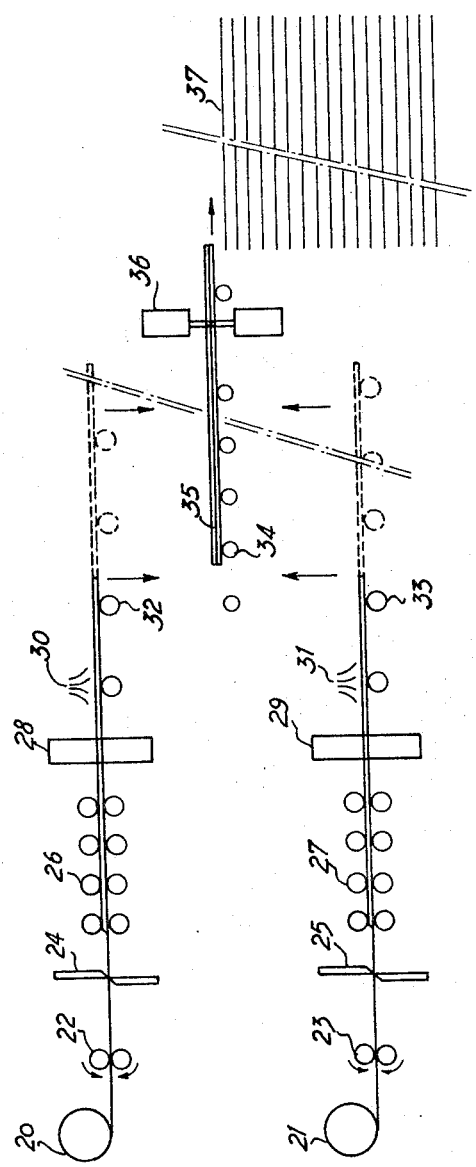
FIG. 6 is a simplified diagram of continuous production line for trays with rectilinear ridges according to the invention, corresponding for instance to the embodiment of FIG. 2 or FIG. 5, where the metal sheets advance parallel to the direction of the rectilinear ridges.

FIG. 6 is a simplified diagram of a continuous production line for guarded trays according to the invention, where the metal sheets advance parallel to the rectilinear ridges to be obtained. This procedure makes it possible to eliminate the joints at right angles to the corrugations when assembling the tray. The light-alloy metal sheets are unwound from two rolls 20 and 21, and go through a pair of guide rolls 22 or 23. They are sheared by shears 24 or 25 to the size of the tray, then embossed at roller forming lines 26 or 27. They are provided with the required perforations or openings at perforating stations 28 or 29, then scoured and pickled at 30 or 31, for instance through solvent spraying and abrasive blasting; they are forwarded by rolls 32, 33 to the transfer device for assembling both sheets one above the other. The composite surface 35 thus obtained is forwarded by rolls 34 to resistance spot welders 36. The finished trays are stacked at 37.

What I claim is:

1. A perforated plate tray assembly for bringing a gas and a liquid into contact, comprising an upper plate providing a surface of contact between the gas and liquid, said upper plate having a non-rectilinear profile and provided with openings for dispersing the gas throughout the liquid, and a lower plate having a non-rectilinear profile, the lower portions of said lower plate forming liquid guards and the upper portions of said lower plate having openings for the free passage of the gas towards the upper plate, said upper and lower plates being fastened to one another in discontinuous areas of contact to form said tray assembly similar to the structure of an assembly of box girders, the upper and lower plates having a corrugated profile and said plates being fastened to one another along areas of contact located on one flank of each corrugation, the openings in the lower plate having flanged edges.

2. A perforated plate tray assembly for bringing a gas and a liquid into contact, comprising an upper plate providing a surface of contact between the gas and liquid, said upper plate having a non-rectilinear profile and provided with openings for dispersing the gas throughout the liquid, and a lower plate having a non-rectilinear profile, the lower portions of said lower plate forming liquid guards and the upper portions of said lower plate having openings for the free passage of the gas towards the upper plate, said upper and lower plates being fastened to one another in discontinuous areas of contact to form said tray assembly similar to the structure of an assembly of box girders, the upper and lower plates having corrugated profiles with the corrugations being of general rectangular cross section and alternately wide and narrow, the upper and lower plates being connected together with the narrow corrugations of one plate positioned within the wide corrugations of the other plate and with the top of the narrow corrugations of one plate engaging the bottom of the wide corrugations of the other plate.

References Cited by the Examiner

UNITED STATES PATENTS

| | | | |
|---|---|---|---|
| 1,899,617 | 2/1933 | Herz | 29—160 |
| 2,018,085 | 10/1935 | Otte | 29—160 |
| 2,339,561 | 1/1944 | Durrum | 261—114 |
| 2,884,236 | 4/1959 | Maille | 261—114 |
| 2,903,251 | 9/1959 | Thrift | 261—114 |

FOREIGN PATENTS 765,623   1/1957   Great Britain.

HARRY B. THORNTON, *Primary Examiner.*

RONALD R. WEAVER, *Examiner.*

E. H. RENNER, *Assistant Examiner.*